United States Patent [19]

Williams, III

[11] 3,933,749

[45] Jan. 20, 1976

[54] POLYTHIOETHERIMIDES AND METHOD OF PREPARATION

[75] Inventor: Frank J. Williams, III, Scotia, N.Y.

[73] Assignee: General Electric Company, Schenectady, N.Y.

[22] Filed: Aug. 23, 1974

[21] Appl. No.: 500,135

[52] U.S. Cl. ..... 260/47 CP; 260/33.4 P; 260/338 R; 260/37 N; 260/46.5 E; 260/49; 260/63 R; 260/78 TF; 260/79; 260/79.3 M; 428/474
[51] Int. Cl.² .......................................... C08G 73/10
[58] Field of Search .......... 260/79.3 M, 78 TF, 65, 260/47 CP, 46.5 E, 63 R, 79, 346.3, 49, 326 S

[56] References Cited
UNITED STATES PATENTS

| | | |
|---|---|---|
| 3,787,364 | 1/1974 | Wirth et al............................ 260/61 |
| 3,838,097 | 9/1974 | Wirth et al............................ 260/49 |

*Primary Examiner*—Lester L. Lee
*Attorney, Agent, or Firm*—William A. Teoli; Joseph T. Cohen; Jerome C. Squillaro

[57] ABSTRACT

Polythioetherimides are provided and a method for making such materials. Aromatic bis(thioetheranhydride)s are reacted with organic diamine in the presence of organic solvent, or in the melt. The polythioetherimides are injection moldable thermoplastics which can be used to make high performance composites.

13 Claims, No Drawings

POLYTHIOETHERIMIDES AND METHOD OF PREPARATION

The present invention relates to polythioetherimides which can be made under melt conditions, or in the presence of organic solvent, by effecting reaction between aromatic bis(thioetheranhydride) and organic diamine.

The polythioetherimides of the present invention consist essentially of the following chemically combined units,

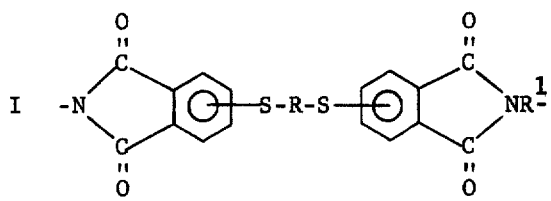

where R is a divalent aromatic organic radical having from 6–30 carbon atoms and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula,

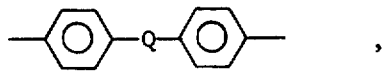

where Q is a member selected from the class consisting of divalent radicals of the formulas, $-C_yH_{2y}-$,

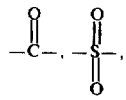

—O—, and —S—, and y is a whole number from 1 to 5 inclusive.

The polythioetherimides of formula I can be made by various methods. One procedure involves the reaction of an aromatic bis(thioetheranhydride) of the formula,

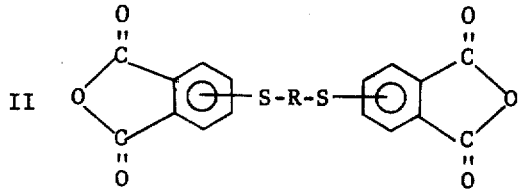

with an organic diamine of the formula, in the melt,

III    $NH_2R^1NH_2$ at temperatures of at least 100°C., where R and $R^1$ are as previously defined.

Another method which can be used to make the polythioetherimide is by the reaction of bis(thioetheranhydride) of formula II and organic diamine of formula III in the presence of a phenolic solvent at temperatures of from 100° to 250°C. and preferably 130° to 200°C. Water of reaction is removed to facilitate polythioetherimide formation. A mixture of a low boiling and higher boiling solvent also can be used which serves as an azeotroping agent.

A further method which can be used to make the polythioetherimide is by a halo- or nitro- displacement route. A bis phthalimide of the formula,

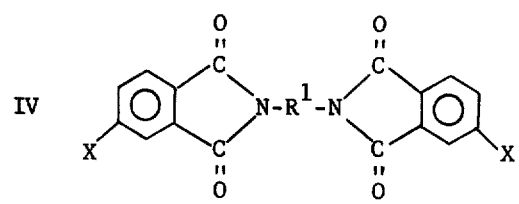

can be reacted in the presence of a dipolar aprotic organic solvent with a dithiophenoxide salt of the formula,

V    M—S—R—S—M, where R and $R^1$ are as previously defined, M is an alkali metal such as sodium, and X is a radical selected from nitro, chloro, fluoro, bromo, etc.

The aromatic bis(thioetheranhydride)s of formula II, and methods for making are shown in my copending application Ser. No. 500,136 filed concurrently herewith. Included by these dianhydrides are, for example,

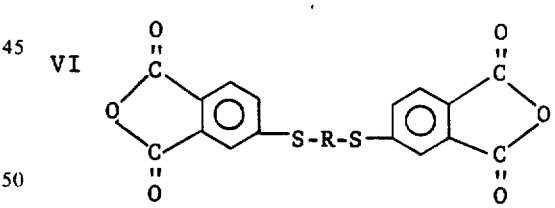

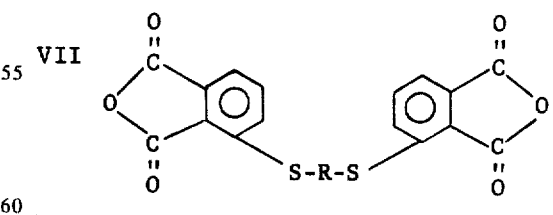

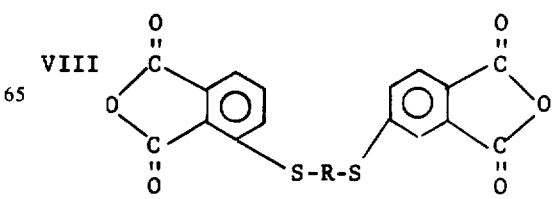

where R is as previously defined.

A method for making the aromatic bis(thioetheranhydride) as shown in copending application Ser. No. 500,136) filed concurrently herewith and assigned to the same assignee as the present invention is by effecting reaction between an aromatic dithiol of the formula,

IX  HSRSH, and a substituted anhydride of the formula,

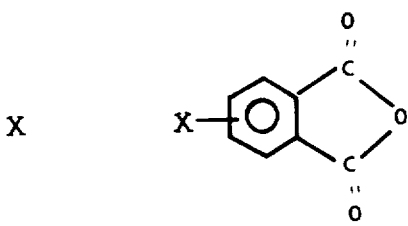

X where R is as previously defined.

Another procedure which can be used to make the above shown thiodianhydrides is by effecting reaction in the presence of base between an aromatic dithiol of formula IX and a substituted phthalimide of the formula,

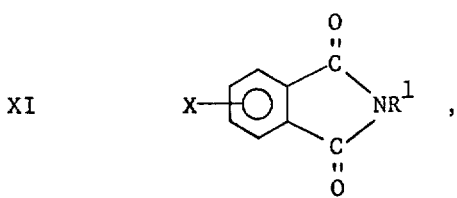

XI to produce a bis phthalimide which thereafter can be hydrolyzed to the thiodianhydride, where $R^1$ and X are as previously defined.

Alternatively a preformed basic salt of the aromatic dithiol of the formula IX can be reacted with phthalic acid derivatives of the formulas X–XI. Base hydrolysis of the aromatic thioether bis imide resulting from compounds of formula XI with the aromatic dithiol or preformed basic salt thereof, to the corresponding tetra acid salt, and tetra acid will produce the dianhydride of formula VI.

Included by the organic diamine of formula III are,
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-diaminotoluene; 2,6-diaminotoluene;
2,4-bis(β-amino-t-butyl)toluene;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
hexamethylenediamine;
heptamethylenediamine; 2,4-diaminotoluene;
nonamethylenediamine; 2,6-diaminotoluene;
bis-(3-aminopropyl)tetramethyldisiloxane, etc.

The polythioetherimides of formula I can be made by a melt polymerization procedure involving the aromatic bis(thioether anhydride) of formula II hereinafter referred to as "dianhydride" and organic diamine of formula III. An inert atmosphere such as nitrogen can be employed to form a homogeneous melt, and water as it is formed can be removed therefrom.

Temperature of the melt is maintained above the glass transition of the resulting polyetherimide but below about 300°C. Preferably, a temperature in the range of from 200° to 280°C. can be used. Polymerization can be facilitated by purging the melt with an inert gas such as nitrogen. A reduced pressure also can be used to remove water. During polymerization constant agitation of the melt such as by stirring facilitates formulation of polyetherimide.

Substantially equal moles of dianhydride and organic diamine provides optimum results. Effective amounts are from 0.5 to 2.0 moles of organic diamine, per mole of dianhydride. Mono-functional organic amine such as aniline, or organic anhydrides such as phthalic anhydride provide molecular weight control. Low molecular weight polyetherimide can be employed to form copolymers. From 0.1 to 50 mole percent of comonomers based on the total moles of reactants can be employed.

Polythioetherimide having from 2 to 500 and preferably 10 to 50 average repeating units can be formed. These polymers can be blended with various fillers such as silica fillers, glass fibers, carbon whiskers, perlite, etc. The resulting filled compositions can have a proportion of from about 1 parts to 70 parts of filler per hundred parts of polyetherimide. The blending of the filler with the polyetherimide can be achieved by adding the filler prior to forming the melt or directly to the melt. Stirring can be effected with a standard agitating means to facilitate blending the ingredients.

The polythioetherimides of the present invention can be used as an injection moldable plastics, as a wire coating formulation in an appropriate organic solvent to make insulated conductors etc.

In addition to melt polymerization, polythioetherimides of formula I also can be made by halo- or nitro-displacement, involving a bis halo or nitro-phthalimide of formula IV and a dithiophenoxide salt in the presence of a dipolar aprotic organic solvent. The dithiophenoxide salt can be preformed or prepared in situ by effecting reaction with an alkali metal hydroxide and a dithiolorganic compound such as 2,2-bis(4-mercaptophenyl)propane, 4-chlorobenzenedithiol, 4,4'-diphenyletherdithiol, 4,4'-diphenyldithiol, m-benzenedithiol, etc.

Reaction between the bis(phthalimide) of formula IV, and the dithiophenoxide salt can be carried out in the presence of a dipolar aprotic solvent. In addition, mixture was allowed to cool and a product was isolated which was dissolved in chloroform. The solution was then filtered and the product was precipitated by pouring the filtrate into methanol. There was obtained a 2.5 parts of product having an intrinsic viscosity in meta cresol of 1.14 dl/g and a TGA (air) of 480°C. The product was analyzed for $C_{44}H_{30}N_2O_4S_2$; Theoretical C, 73.9; H, 4.2; N, 3.9; Found: C, 73.3; H, 4.6; N, 3.9. Based on method of preparation in the aforesaid analysis, the product was a polythioetherimide consisting essentially of the following chemically combined units:

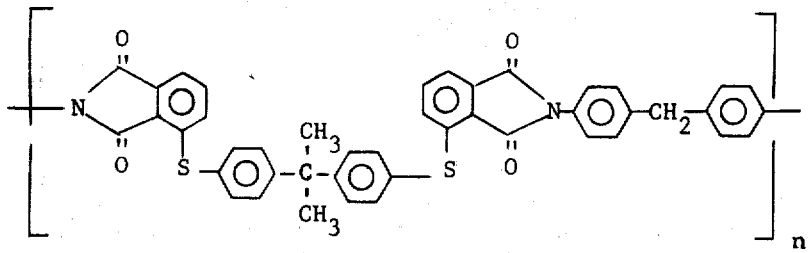

mixtures of dipolar aprotic solvents with inert organic solvents such as benzene, toluene, xylene and methylene chloride may be used. Included by the dipolar aprotic solvents are for example N,N-dimethylformamide, N,N-dimethylacetamide, N,N-diethylformamide, N,N-diethylacetamide, N,N-dimethylmethoxyacetamide, N-methylcaprolactam, dimethylsulfoxide, N-methyl-2-pyrrolidone, tetramethylurea, pyridine, dimethylsulfone, tetramethylenesulfone, N-methylformamide, and N-acetyl-2-pyrrolidone.

Reaction between the bis(phthalimide)s of formula IV and the dithiophenoxide salt is conducted under anhydrous conditions. A final polymerization mixture of the dipolar aprotic solvent can contain from 10–20% by weight of polymer.

Reaction can occur of from 25° to 150°C., over a period of from 0.5 to 24 hours. One polymer can be recovered by precipitation in a non-solvent for the polymer such as methanol.

In order that those skilled in the art will be able to practice the present invention, the following examples are given by way of illustration and not by way of limitation. All parts are by weight.

EXAMPLE 1

A mixture of 2.71 parts of 2,2-bis[4-(2,3-dicarboxythiophenoxy)phenyl]propane dianhydride and one part of methylene dianiline was heated at 300°C. under a nitrogen atmosphere. After 30 minutes, a vacuum was applied and the heating continued for 1 hour. The The above product is found to be readily injection moldable and useful for making a variety of finished parts.

EXAMPLE 2

A mixture of 2.76 parts of the aromatic thioether dianhydride of Example 1 and 1 part of oxydianiline was heated in accordance with the procedure of Example 1. A product was formed and recovered amounting to 2.52 parts. The intrinsic viscosity of the product in meta-cresol was 1.01 dl/g. The product was analyzed for $C_{43}H_{28}N_2O_5S_2$; Theoretical, C, 72.0; H, 4.9; N, 3.9; Found: C, 71.8; H, 4.1; N, 4.0. Based on method of preparation and the aforementioned analysis, the product was a polythioetherimide consisting essentially of the following chemically combined units.

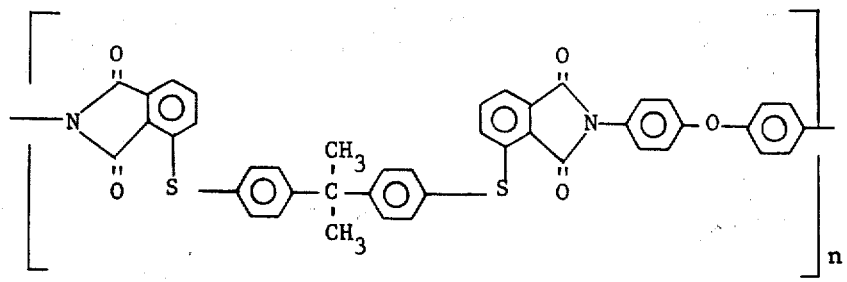

EXAMPLE 3

A mixture of 4.62 parts of the aromatic thioether dianhydride of Example 1, and 1 part of hexamethylenediamine was heated at 200°C. for 10 minutes under a nitrogen atmosphere. The temperature was then raised to 290°C. and the mixture was heated for 30 minutes under nitrogen and 30 minutes under vacuum. The melt was worked up as described in Example 1 to give 3.14 parts of the product. The product had a TGA in air of 440°C. and an intrinsic viscosity in meta-cresol of 1.0 dl/g. The product was analyzed for $C_{37}H_{32}N_2O_4S_2$; Theoretical: C, 70.2; H, 5.1; N, 4.4; Found: C, 69.2; H, 5.2; N, 4.1. Based on method of preparation and the aforementioned analysis the product was a polythiothioether imide consisting essentially of the following chemically combined units.

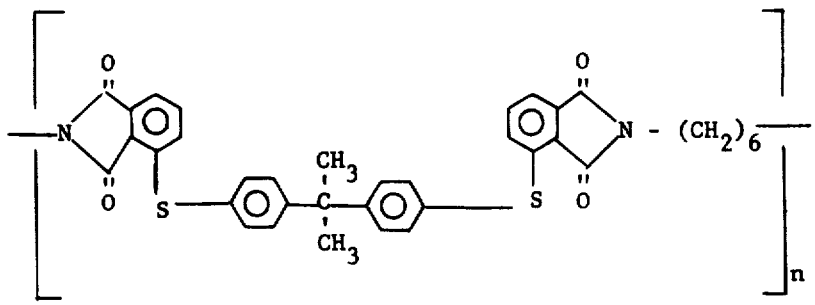

EXAMPLE 4

A mixture of 1 part of meta-phenylenediamine, 5.1 parts of 2,2-bis[4-(2,3-dicarboxythiophenoxy)phenyl] propane dianhydride, 25 parts of m-cresol and 10 parts of toluene was heated under a nitrogen atmosphere at reflux. Water was removed azeotropically from the reaction mixture. After 16 hours, the mixture was cooled to room temperature and added dropwise to a large excess of methanol. The resulting precipitate was collected by filtration and dried to give an excellent yield of a product having an intrinsic viscosity in meta cresol of 0.676 and a $t_g$ of 247°C. Based on the method of preparation, the product was a polythioetherimide consisting essentially of the following chemically combined units.

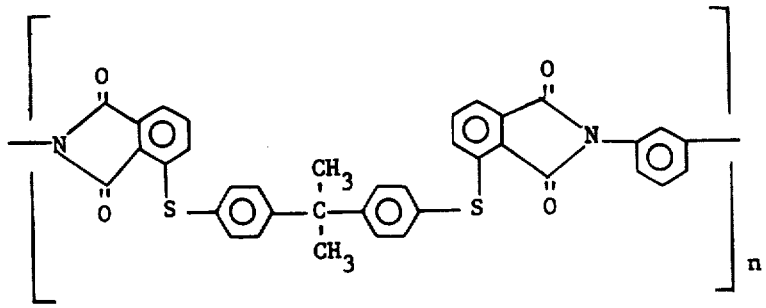

EXAMPLE 5

Example 4 was repeated using 1 part of m-phenylene diamine and 5.12 parts of 2,2-bis[4-(3,4-dicarboxythiophenoxy)phenyl] propane dianhydride, 38 parts of m-cresol and 20 parts of toluene. Upon workup, a material was collected which had an IV (m-cresol) = 0.12. Based on the method of preparation the product was a polythioetherimide consisting essentially of the following chemically combined units.

EXAMPLE 6

A mixture of 1 part of m-phenylene diamine, 4.72 parts of 4,4'-bis[3,4-dicarboxyphenylthio]biphenyl dianhydride, 25 parts of m-cresol, and 3 parts of toluene was treated as described in Example 4. There was obtained a product, IV (m-cresol) = 0.96; $t_g$ = 233°C. Based on the method of preparation, the product was a polythioetherimide consisting essentially of the following chemically combined units.

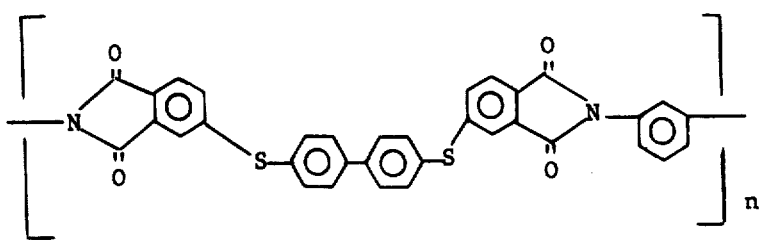

EXAMPLE 7

A mixture of 1 part of m-phenylene diamine, 4.86 parts of 4,4'-Bis(2,3-dicarboxyphenylthio) diphenylether dianhydride, 29 parts of m-cresol, and 6.5 parts of toluene was treated as described in Example 4. There was obtained a product with a $t_g$ 248°C. Based on the method of preparation, the product was a polythioetherimide consisting essentially of the following chemically combined units:

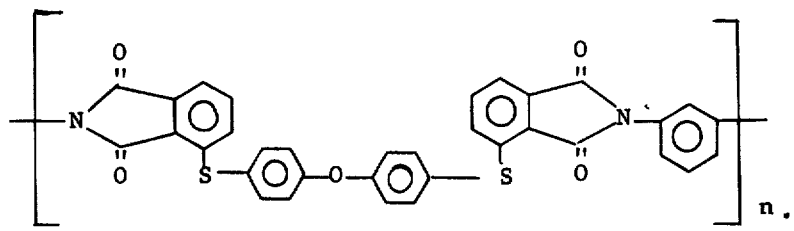

EXAMPLE 9

A mixture of 1 part of m-phenylenediamine, 4.85 parts of 4,4'-Bis[3,4-dicarboxyphenylthio] Diphenylether Dianhydride, 26 parts of m-cresol, and 6.5 parts of toluene was treated as described in Example 4. There was obtained a product, IV (m-cresol) = 0.69, $t_g$ = 217°C. Based on the method of preparation, the product was a polythioetherimide consisting essentially of the following chemically combined units:

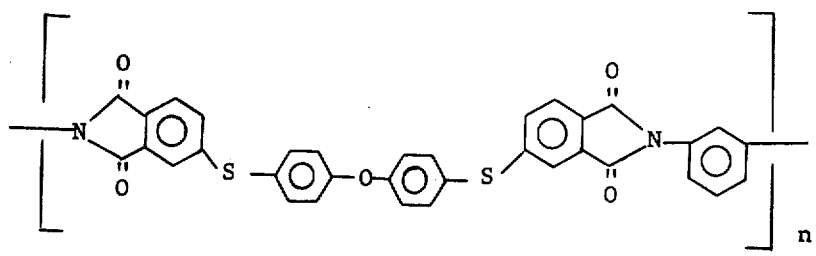

EXAMPLE 8

A mixture of 1 part of m-phenylenediamine, 4.33 parts of 2,4-Bis[2,3-dicarboxyphenylthio] chlorobenzene Dianhydride, 26 parts of m-cresol and 6 parts of toluene was treated as described in Example 4. There was obtained a product; IV (m-cresol) = 0.17, $t_g$ = 222°C. Based on the method of preparation, the product was a polythioetherimide consisting essentially of the following chemically combined units:

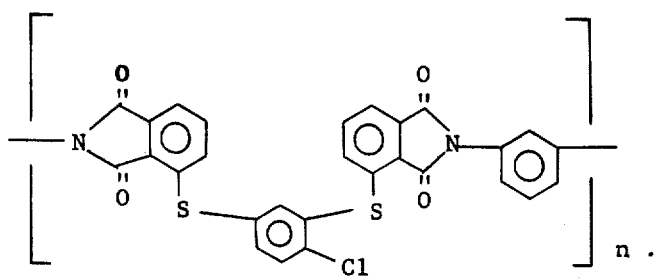

EXAMPLE 10

A mixture of 1 part of hexamethylene diamine, 4.52 parts of 4,4'-Bis(3,4-dicarboxyphenylthio) diphenylether dianhydride, 26 parts of m-cresol, and 6.5 parts of toluene was treated as described in Example 4. There was obtained a product, IV (m-cresol) = 0.50, $t_g$ = 121.5°C. Based on the method of preparation, the product was a polythioetherimide consisting essentially of the following chemically combined units:

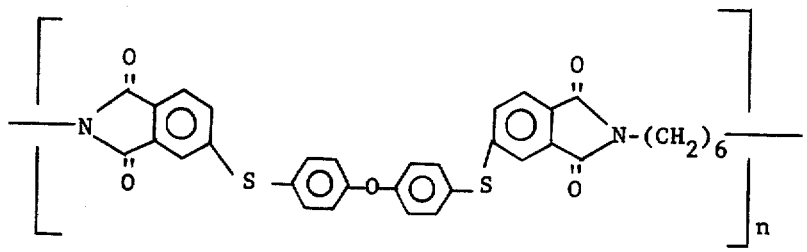

EXAMPLE 11

A mixture of one part of 4,4'-diphenyletherdithiol, 1.75 parts of the bisimide derived from 3-fluorophthalic anhydride and hexamethylene diamine, 8 parts of anhydrous dimethylformamide and 0.97 parts of triethylamine was stirred at 50°C. for 2 hours under a nitrogen atmosphere. The mixture was cooled to room temperature and added to a large excess of methanol. The resulting solid was collected by filtration and dried. There was obtained a product; IV (m-cresol) = 0.63; $t_g$ = 158°C. Based on the method of preparation as well as its $^{13}$C NMR spectrum, the product was a polythioetherimide consisting essentially of the following chemically combined units:

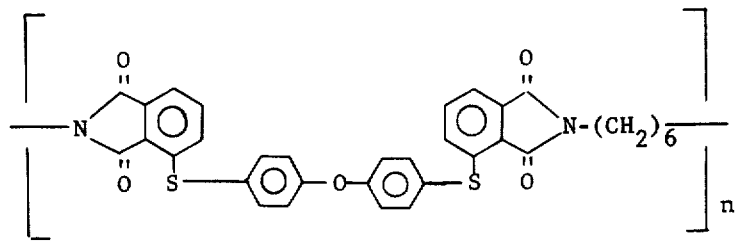

EXAMPLE 12

A mixture of 1.5 parts of 4,4'-diphenyletherdithiol, 3.390 parts of the bisimide derived from 3-chlorophthalic anhydride and oxydianiline, 14 parts of anhydrous dimethylformamide and 1.46 parts of triethylamine was treated as described in Example 11. There was obtained a product; $t_g$ = 216°C. Based on the method of preparation the product was a polythioetherimide consisting essentially of the following chemically combined units:

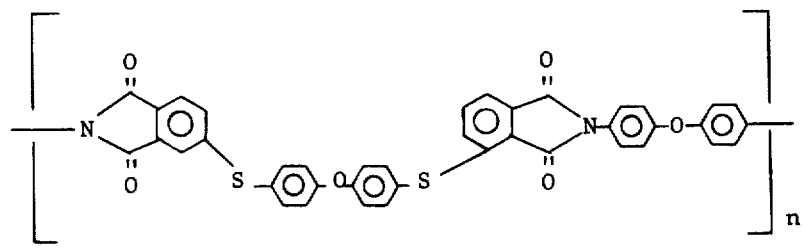

Although the above examples are limited to only a few of the very many variables which can be used in the practice of the present invention, it should be understood that the present invention is directed to a much broader variety of polythioetherimides based in the use of aromatic bis(thioetheranhydride) or bis nitro or halophthalimide of formulas II and IV in combination with appropriate reagents respectively.

What I claim as new and desire to secure by Letters Patent of the United States is:

1. Polythioetherimide consisting essentially of chemically combined units of the formula

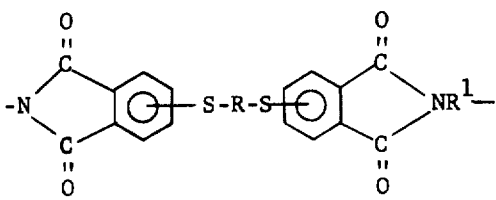

where R is a divalent aromatic organic radical having from 6–30 carbon atoms and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula,

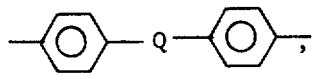

where Q is a member selected from the class consisting of divalent radicals of the formulas, $-C_yH_{2y}-$,

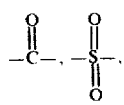

$-O-$, and $-S-$, and y is a whole number from 1 to 5 inclusive.

2. Polythioetherimide in accordance with claim 1, consisting essentially of chemically combined units of the formula,

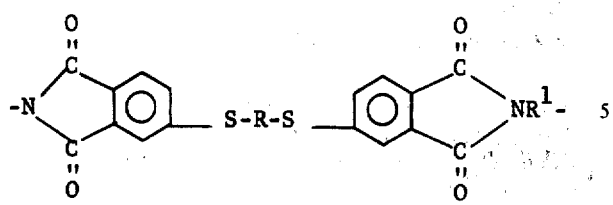

3. Polythioetherimides in accordance with claim 1, consisting essentially of chemically combined units of the formula,

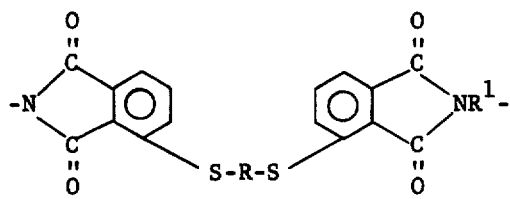

4. Polythioetherimides in accordance with claim 1, consisting essentially of a mixture of units of

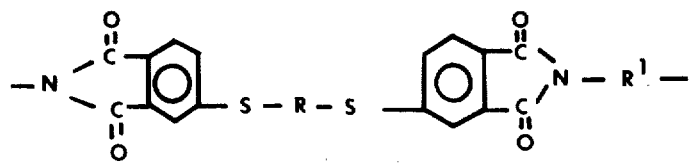

and

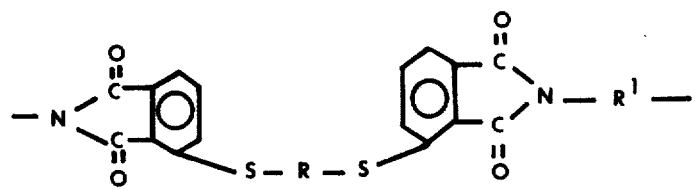

5. Polythioetherimide in accordance with claim 1, where R is

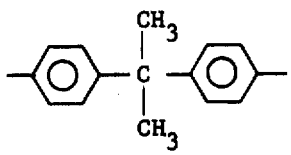

6. Polythioetherimide in accordance with claim 1, where R is

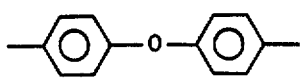

7. Polythioetherimide in accordance with claim 1, where R is

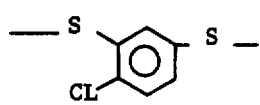

8. Polythioetherimide in accordance with claim 1, where R is

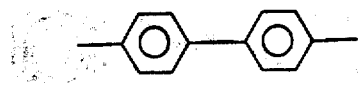

9. Polythioetherimide in accordance with claim 1, where $R^1$ is

10. Polythioetherimide in accordance with claim 1, where R' is

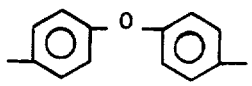

11. Polythioetherimide in accordance with claim 1, where R' is

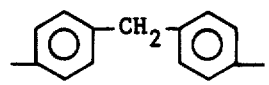

12. A process which comprises effecting the removal of water of reaction from the melt of a mixture by agitation, by stripping under reduced pressure, or by purging with an inert gas which mixture contains an essential ingredients 1. aromatic bis(thioetheranhydride) of the formula,

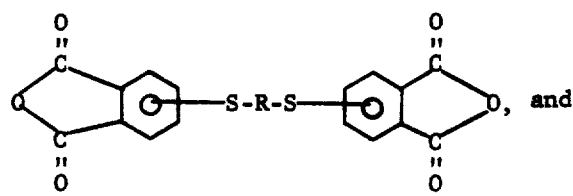

2. organic diamine of the formula
   $NH_2R'NH_2$
   where R and $R^1$ are as previously defined as in claim 1.

13. A process which comprises
1. effecting reaction under anhydrous conditions at a temperature in the range of from 25° to 150°C between a bis nitrophthalimide of the formula

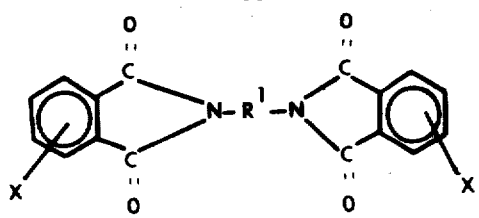
in the presence of a dipolar aprotic organic solvent with a dithiophenoxide salt of the formula,
M—S—R—S—M,
where R and $R^1$ are as previously defined as in claim 1, M is an alkali metal and X is a displaceable radical selected from the class consisting of nitro, chloro, fluoro and bromo.
* * * * *